United States Patent
Wu et al.

(10) Patent No.: US 12,083,445 B2
(45) Date of Patent: Sep. 10, 2024

(54) AUTOMATED GUIDED VEHICLE TOOL FOR ENTERTAINMENT AND TRANSPORTATION, AND CONNECTION COMPONENT

(71) Applicants: SHENZHEN YEE FUNG AUTOMATION TECHNOLOGY CO., LTD., Guangdong (CN); SHENZHEN YEEFUNG ROBOTICS CO., LTD., Guangdong (CN)

(72) Inventors: Hao Wu, Guangdong (CN); Yi Qu, Guangdong (CN); Ye Zhou, Guangdong (CN); Yingjie Cai, Guangdong (CN)

(73) Assignees: SHENZHEN YEE FUNG AUTOMATION TECHNOLOGY CO., LTD., Shenzhen (CN); SHENZHEN YEEFUNG ROBOTICS CO., LTD., Shenzhen (CN)

( * ) Notice: Subject to any disclaimer, the term of this patent is extended or adjusted under 35 U.S.C. 154(b) by 690 days.

(21) Appl. No.: 17/349,905

(22) Filed: Jun. 16, 2021

(65) Prior Publication Data

US 2022/0001937 A1    Jan. 6, 2022

Related U.S. Application Data

(63) Continuation of application No. PCT/CN2020/106381, filed on Jul. 31, 2020.

(30) Foreign Application Priority Data

Jul. 3, 2020  (CN) .......................... 202010636492.9

(51) Int. Cl.
*A63G 31/16* (2006.01)
*B60K 17/22* (2006.01)
(Continued)

(52) U.S. Cl.
CPC .............. *A63G 31/16* (2013.01); *B60K 17/22* (2013.01); *B60W 60/0013* (2020.02); *B62D 31/003* (2013.01); *G09B 9/042* (2013.01)

(58) Field of Classification Search
CPC .......... G09B 9/04; G09B 9/042; A63G 31/16; B60K 17/22; B62D 31/003; B62D 31/00; B60W 60/0013
See application file for complete search history.

(56) References Cited

U.S. PATENT DOCUMENTS 4,564,356 A  *  1/1986  Winfree ................... G09B 9/04
                                                      434/58
4,584,896 A  *  4/1986  Letovsky ............... A63G 31/16
                                                      434/57
(Continued)

FOREIGN PATENT DOCUMENTS

CN         201052410 Y         4/2008
CN         201921478 U         8/2011
(Continued)

OTHER PUBLICATIONS

International Search Report of PCT Patent Application No. PCT/CN2020/106381 issued on Mar. 29, 2021.
(Continued)

*Primary Examiner* — Timothy Wilhelm

(57) ABSTRACT

An AGV tool for entertainment and transportation includes a cabin, an AGV base, and a connection component connecting the cabin and the AGV base. The connection component includes a supporting component, a driving component, an upper installation component and a lower installation component. The driving component is fixedly connected to the supporting component. The supporting component includes two supporting arms and a supporting plate. The two supporting arms are arranged at two sides of the supporting plate. One end of each supporting arm is (Continued)

connected to one end of the supporting plate at a preset angle. The upper installation component is connected to another end of the supporting plate and configured to fixedly connect the cabin. The lower installation component is connected to the driving component and configured to fixedly connect to a supporting surface of the AGV base.

20 Claims, 7 Drawing Sheets

(51) Int. Cl.
*B60W 60/00* (2020.01)
*B62D 31/00* (2006.01)
*G09B 9/042* (2006.01)

(56) References Cited

U.S. PATENT DOCUMENTS

| | | | | |
|---|---|---|---|---|
| 5,018,973 | A * | 5/1991 | Alet | G09B 9/04 434/58 |
| 5,605,462 | A * | 2/1997 | Denne | H02K 7/00 434/45 |
| 5,865,624 | A * | 2/1999 | Hayashigawa | G09B 9/04 472/60 |
| 5,947,740 | A * | 9/1999 | Kim | G09B 9/14 434/30 |
| 6,095,926 | A * | 8/2000 | Hettema | A63G 31/16 472/43 |
| 6,354,838 | B1 * | 3/2002 | Tagge | G09B 9/05 434/69 |
| 6,586,854 | B1 * | 7/2003 | Nozawa | G09B 9/12 310/90 |
| 6,592,374 | B1 * | 7/2003 | Kim | G09B 9/04 434/30 |
| 6,632,092 | B2 * | 10/2003 | Moran | G09B 19/16 472/59 |
| 7,094,157 | B2 * | 8/2006 | Fromyer | A63G 31/12 472/130 |
| 7,484,460 | B2 * | 2/2009 | Blum | A63G 21/14 104/53 |
| 9,084,941 | B1 * | 7/2015 | Fram | A63G 7/00 |
| 9,155,972 | B2 * | 10/2015 | Van Lookeren Campagne | A63G 31/16 |
| 9,586,152 | B1 * | 3/2017 | Lee | G09B 9/04 |
| 9,610,511 | B1 * | 4/2017 | Francis | A63G 23/00 |
| 9,666,093 | B2 * | 5/2017 | In | G01M 17/007 |
| 9,666,094 | B2 * | 5/2017 | In | F16M 11/2092 |
| 9,943,773 | B2 * | 4/2018 | Li | A63J 25/00 |
| 10,186,165 | B2 * | 1/2019 | Hosaka | G09B 9/14 |
| 10,403,164 | B2 * | 9/2019 | Tischer | A63G 31/16 |
| 10,410,536 | B2 * | 9/2019 | Minen | G09B 9/04 |
| 10,650,695 | B2 * | 5/2020 | Minen | G01M 17/007 |
| 11,195,430 | B2 * | 12/2021 | Veltena | G09B 9/04 |
| 11,538,353 | B2 * | 12/2022 | Warne | A63G 31/02 |
| 11,828,410 | B2 * | 11/2023 | In | H02K 7/06 |
| 11,896,912 | B2 * | 2/2024 | Smit | G09B 9/04 |
| 11,931,662 | B2 * | 3/2024 | Smith | A63G 31/02 |
| 2003/0180693 | A1 * | 9/2003 | Mulder | G09B 9/04 434/58 |
| 2005/0042578 | A1 * | 2/2005 | Ammon | G09B 9/04 434/62 |
| 2007/0018511 | A1 * | 1/2007 | Schulz | G09B 9/042 472/43 |
| 2007/0111170 | A1 * | 5/2007 | Lefton | G09B 9/04 434/29 |
| 2007/0262628 | A1 * | 11/2007 | Perigny | A63F 13/28 297/284.4 |
| 2009/0136903 | A1 * | 5/2009 | McNeil | G09B 9/058 434/29 |
| 2010/0216097 | A1 * | 8/2010 | Romagnoli | G09B 9/02 434/62 |
| 2014/0290400 | A1 * | 10/2014 | Choi | A63G 31/16 74/25 |
| 2015/0030999 | A1 * | 1/2015 | Lee | G09B 9/14 434/62 |
| 2018/0028924 | A1 * | 2/2018 | Sawade | B60B 19/14 |
| 2018/0247557 | A1 * | 8/2018 | Brice | G09B 9/04 |
| 2019/0236970 | A1 * | 8/2019 | Minen | G09B 9/02 |
| 2020/0035114 | A1 * | 1/2020 | Koga | A47C 1/00 |
| 2021/0255064 | A1 * | 8/2021 | Sones | G01M 17/0078 |
| 2022/0180765 | A1 * | 6/2022 | Warne | G09B 9/042 |
| 2022/0249965 | A1 * | 8/2022 | Lindinger | G01S 17/42 |
| 2022/0254268 | A1 * | 8/2022 | Warne | G09B 9/04 |
| 2023/0237927 | A1 * | 7/2023 | Minen | G09B 9/05 434/69 |
| 2023/0256352 | A1 * | 8/2023 | HajiChristou | A63G 31/16 472/59 |
| 2024/0092579 | A1 * | 3/2024 | Liu | B65G 1/1375 |

FOREIGN PATENT DOCUMENTS

| | | | |
|---|---|---|---|
| CN | 201921481 U | 8/2011 | |
| CN | 203666663 U | 6/2014 | |
| CN | 203886178 U | 10/2014 | |
| CN | 204337734 U | 5/2015 | |
| CN | 204352545 U | 5/2015 | |
| CN | 104786771 A | 7/2015 | |
| CN | 105641928 A | 6/2016 | |
| CN | 206325217 U | 7/2017 | |
| CN | 207758907 U | 8/2018 | |
| CN | 208789677 U | 4/2019 | |
| CN | 111344047 A | 6/2020 | |
| CN | 212654447 U | 3/2021 | |
| DE | 2357156 A1 | 5/1975 | |
| JP | 2000218056 A | 8/2000 | |
| JP | 2017529200 A | 10/2017 | |
| KR | 20160022174 A * | 2/2016 | G09B 9/00 |
| WO | 2013187235 A1 | 12/2013 | |

OTHER PUBLICATIONS

Search Report of counterpart Hong Kong Short Term Patent Application No. 2020106364929 issued on Sep. 4, 2020.
Japanese Notice of Reasons for Refusal, Japanese Patent Application No. 2022-513661, mailed Mar. 14, 2023 (4 pages).
Japanese Decision to Grant a Patent, Japanese Patent Application No. 2022-513661, mailed May 30, 2023 (5 pages).

* cited by examiner

AUTOMATED GUIDED VEHICLE TOOL FOR ENTERTAINMENT AND TRANSPORTATION, AND CONNECTION COMPONENT

CROSS-REFERENCE TO RELATED APPLICATIONS

The present application is a continuation-application of International (PCT) Patent Application No. PCT/CN2020/106381, filed on Jul. 31, 2020, which claims foreign priority of Chinese Patent Application No. 202010636492.9, filed on Jul. 3, 2020 in the China National Intellectual Property Administration, the entire contents of which are hereby incorporated by reference.

TECHNICAL FIELD

The present disclosure generally relates to automated guided technology, and in particular to an AGV tool for entertainment and transportation and a connection component.

BACKGROUND

An Automated Guided Vehicle (AGV) refers to a vehicle equipped with automatic guidance equipment and capable of moving along the preset guidance path. The AGV can be made an AGV tool for entertainment and transportation when its base is connected to a manned cabin, which can be used to, for example, carry passengers to move in a playground along a preset path. The AGV base needs to be connected to the cabin through a connection component. Traditional connection components for connecting the AGV base and the cabin are usually very stiff, which may influence the user experience. When passengers in the cabin move, the center of gravity of the cabin may be changed, which may cause irreversible reflection of the AGV base. In severe cases, the whole AGV tool for entertainment and transportation may overturn accordingly.

SUMMARY

Accordingly, the present disclosure aims to provide an AGV tool for entertainment and transportation and a connection component, which aims to improve the stability and user experience of the AGV tool for entertainment and transportation.

In one aspect of the present disclosure, an AGV tool for entertainment and transportation is provided. The AGV includes an AGV base, and a connection component connecting the cabin and the AGV base. The AGV base comprises a central carriage component and a driving wheel component. The central carriage component comprises a top part and a bottom part spaced apart from and parallel to each other. The top part has a supporting surface. The top part and the bottom part are connected by a plurality of brackets and cooperatively define a receiving space. The driving wheel component is arranged in the receiving space and configured to drive the AGV base to move. The connection component comprises a supporting component, a driving component, an upper installation component and a lower installation component. The driving component is fixed to the supporting component. The supporting component comprises two supporting arms and a supporting plate. The two supporting arms are arranged at two sides of the supporting plate. One end of each of the two supporting arms is fixed to one end of the supporting plate at a preset angle. The upper installation component is connected to another end of the supporting plate and configured to fixedly connect to the cabin. The lower installation component is connected to the driving component and configured to fixedly connect to the supporting surface of the AGV base. The driving component is configured to drive the two supporting arms to rotate so as to drive the supporting plate to move in a first preset range along a first direction so as to buffer shaking of the cabin.

In another aspect of the present disclosure, a connection component is provided. The connection component includes: a supporting component comprising two supporting arms and a supporting plate; wherein the two supporting arms are arranged at two sides of the supporting plate, one end of each of the two supporting arms is fixed to one end of the supporting plate at a preset angle, another end of each of the two supporting arms is arranged with a first through hole; a driving component comprising a driving motor and a transmission shaft connected to each other; wherein the transmission shaft passes through the first through hole of each of the two supporting arms and is fixedly connected to the two supporting arms at the first through hole; an upper installation component connected to the another end of the supporting plate, and configured to fixedly connect to a first other component; and a lower installation component connected to the driving component, and configured to fixedly connect to a second other component; wherein, when the driving motor drives the transmission shaft to rotate, the two supporting arms are driven to rotate and accordingly drive the supporting plate to move in a first preset range along a first direction.

According to the present disclosure, the AGV tool for entertainment and transportation includes a cabin, an AGV base, and a connection component connecting the cabin and the AGV base. The connection component includes a supporting component, a driving component, an upper installation component and a lower installation component. The driving component is fixedly connected to the supporting component. The supporting component includes two supporting arms and a supporting plate. The two supporting arms are arranged at two sides of the supporting plate. One end of each supporting arm is connected to one end of the supporting plate at a preset angle. The upper installation component is connected to another end of the supporting plate and configured to fixedly connect the cabin. The lower installation component is connected to the driving component and configured to fixedly connect to a supporting surface of the AGV base. According to the present disclosure, the supporting plate may be driven by the driving component to move in a first preset range in a first direction, which may provide cushioning to the connection component. On one hand, the cabin may be driven to only deflect in a safe range, which may make the device more entertaining. On the other hand, deflection of the AGV base caused by change of the center of gravity of the cabin may be buffered, which may improve the stability of the AGV tool for entertainment and transportation

BRIEF DESCRIPTION OF THE DRAWINGS

In order to describe the technical solutions in the embodiments of the present disclosure more clearly, the drawings used for the description of the embodiments will be briefly described below. Apparently, the described drawings are merely some embodiments of the present disclosure. Those of ordinary skills in the art can acquire other drawings based on the principle of these drawings without creative efforts.

DETAILED DESCRIPTION

The disclosure will now be described in detail with reference to the accompanying drawings and examples. Apparently, the described embodiments are only a part of the embodiments of the present disclosure, not all of the embodiments. All other embodiments obtained by a person of ordinary skill in the art based on the embodiments of the present invention without creative efforts shall fall within the protection scope of the present invention.

Figure 1:
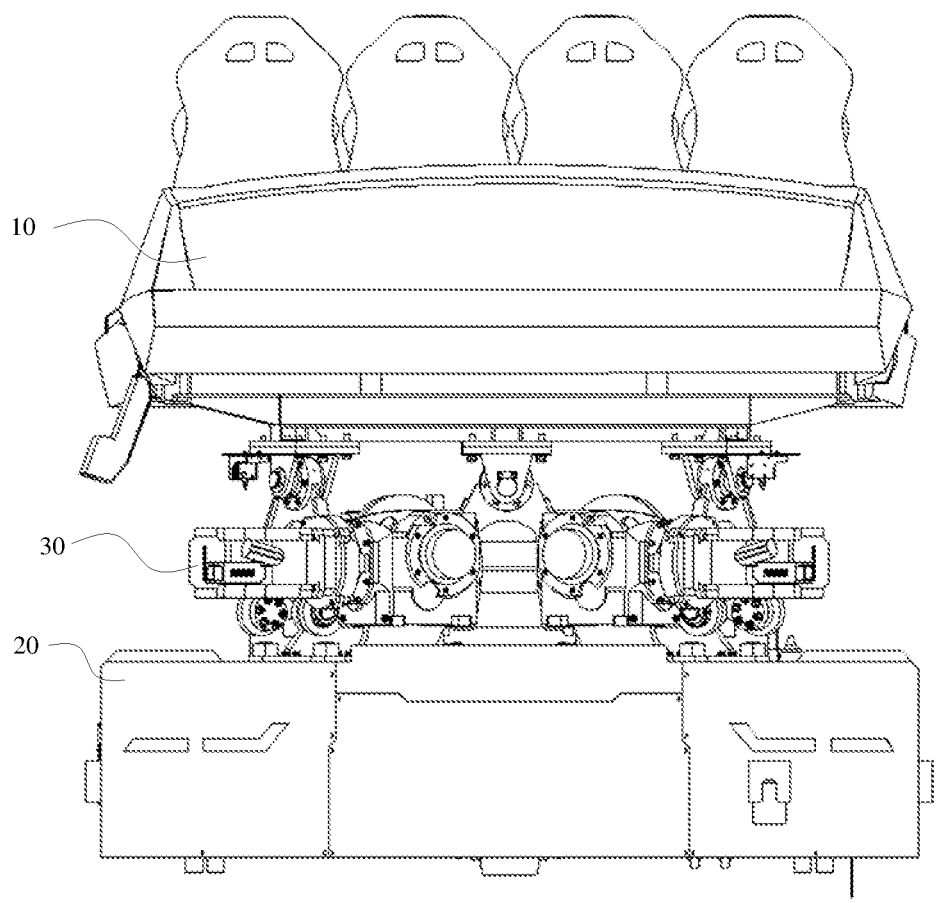
FIG. 1 illustrates a schematic diagram of an AGV tool for entertainment and transportation according to an embodiment in the present disclosure.
Figure 2:
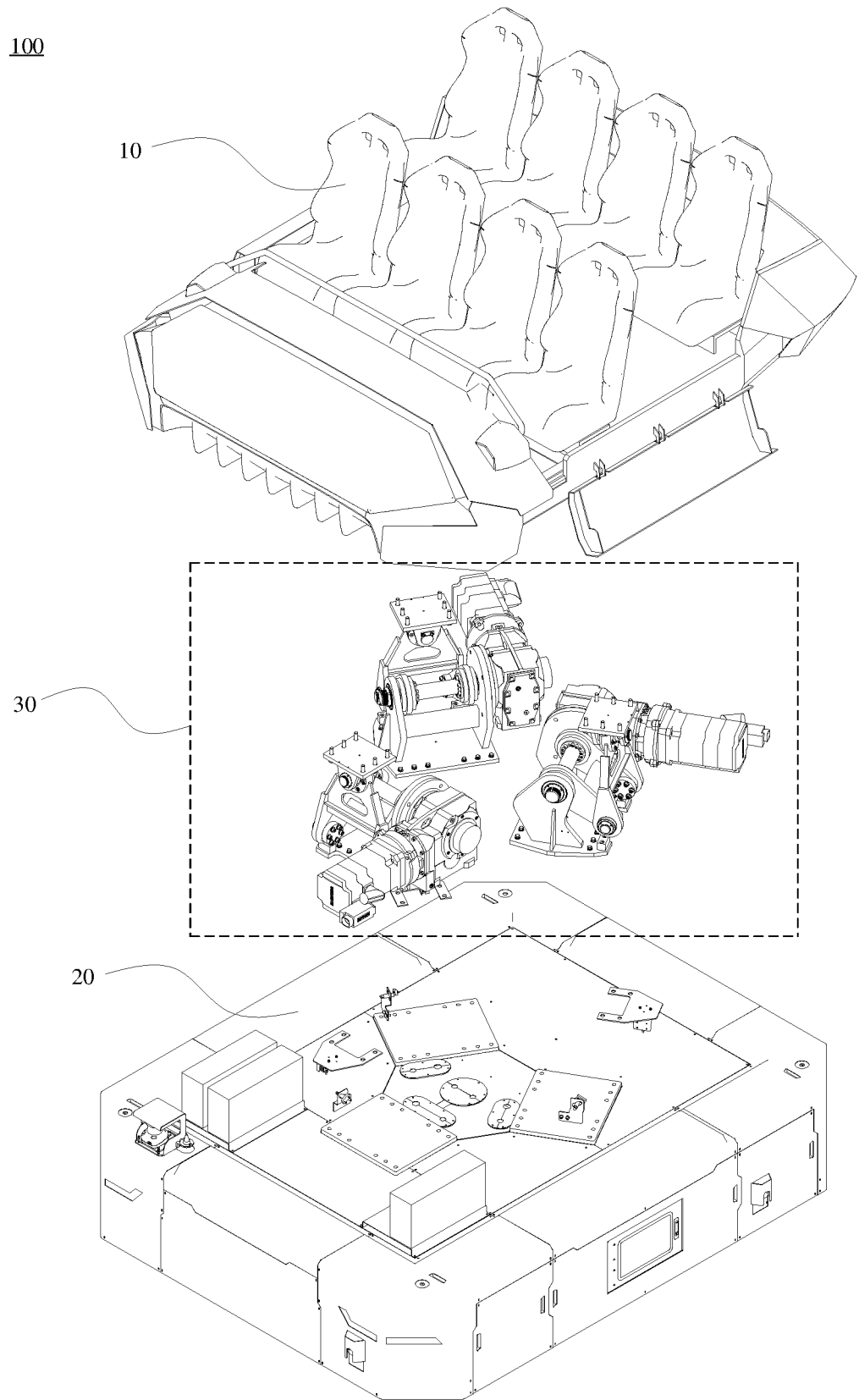
FIG. 2 illustrates an exploded view of the AGV tool illustrated in FIG. 1.

Referring to FIGS. 1 and 2, FIG. 1 illustrates a schematic diagram of an AGV tool for entertainment and transportation according to an embodiment in the present disclosure, and FIG. 2 illustrates an exploded view of the AGV tool illustrated in FIG. 1. The AGV tool 100 includes a cabin 10, an AGV base 20, and a connection component 30 connecting the cabin 10 and the AGV base 20. The cabin 10 may be designed with multiple seats such as 4, 6, 8, 10, 12 etc. In FIGS. 1 and 2, eight seats are shown for illustrative purpose. The number of the connection component 30 is no less than three, and is preferably three. Three connection positions where the three connection components 30 connect to the cabin 10 are located in a same plane such that the cabin 10 may be steady. Three connection positions where the three connection components 30 connect to the AGV base 20 are also located in a same plane substantially parallel to the plane where the cabin is located. This configuration may make the AGV tool 100 steadier.

Figure 3A:
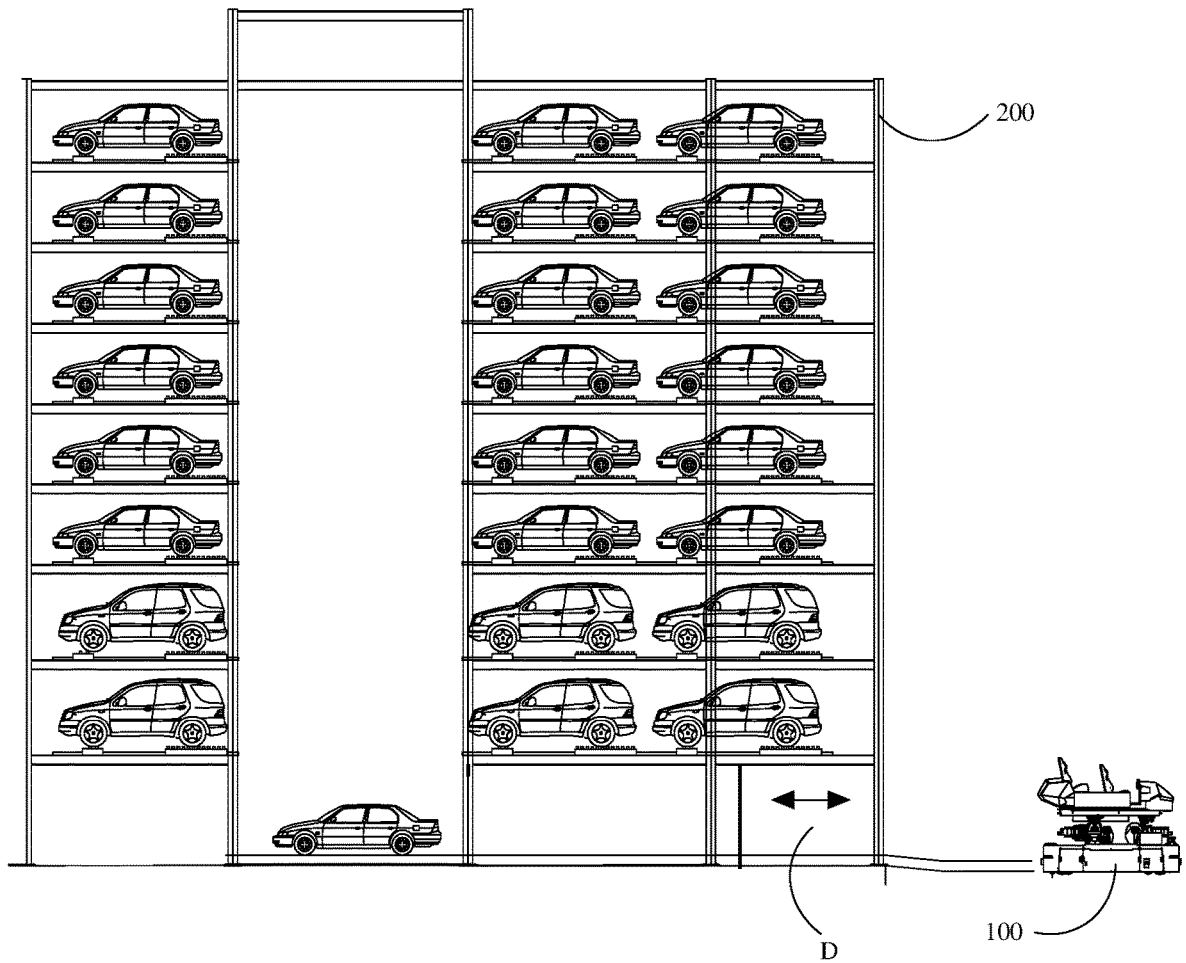
FIG. 3a illustrates a scene where the AGV tool is utilized in a placement area of a stereo-garage according to an embodiment in the present disclosure.
Figure 3B:
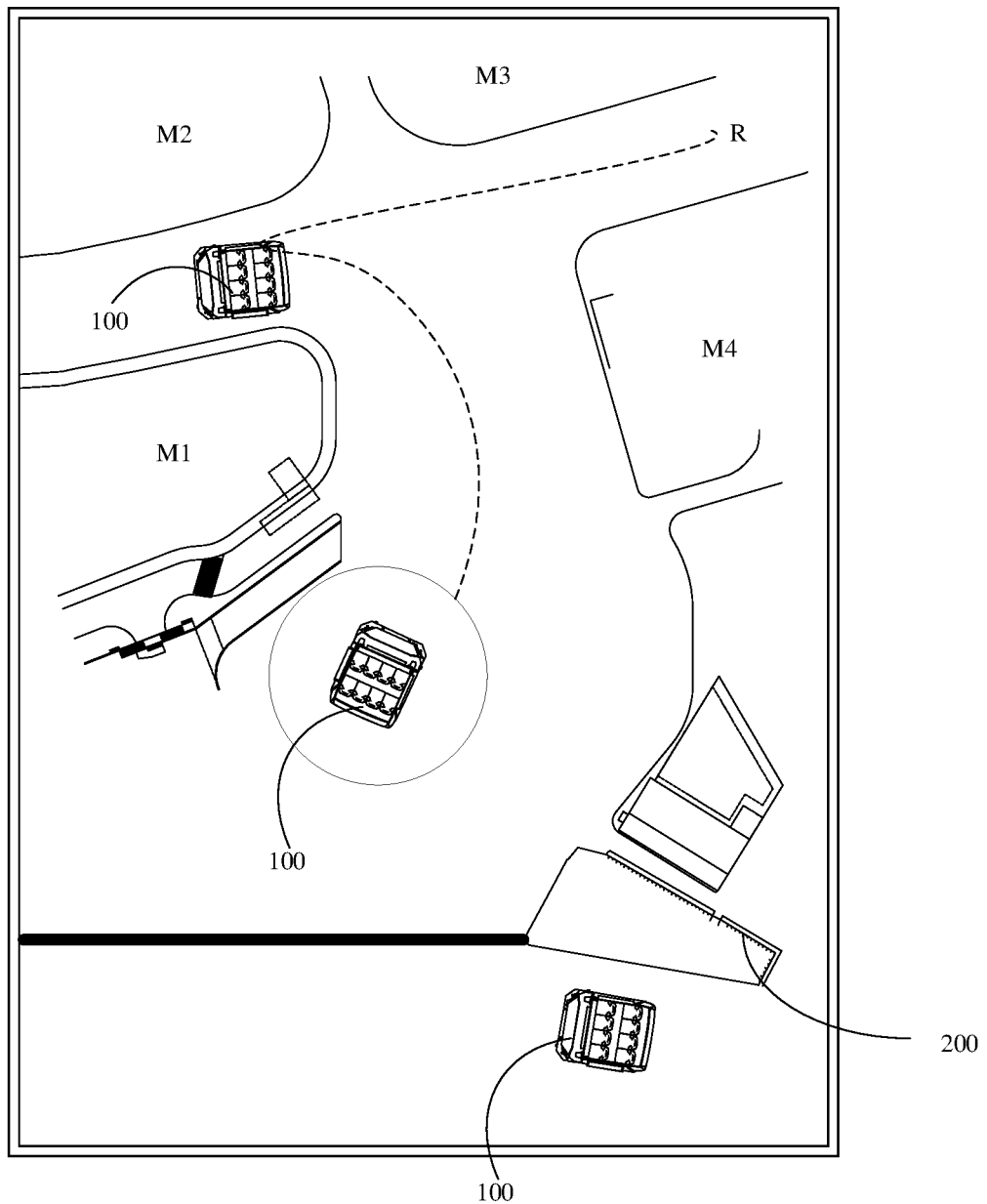
FIG. 3b illustrates a scene where the AGV tool is utilized in a placement area of a playground according to an embodiment in the present disclosure.
Figure 4:
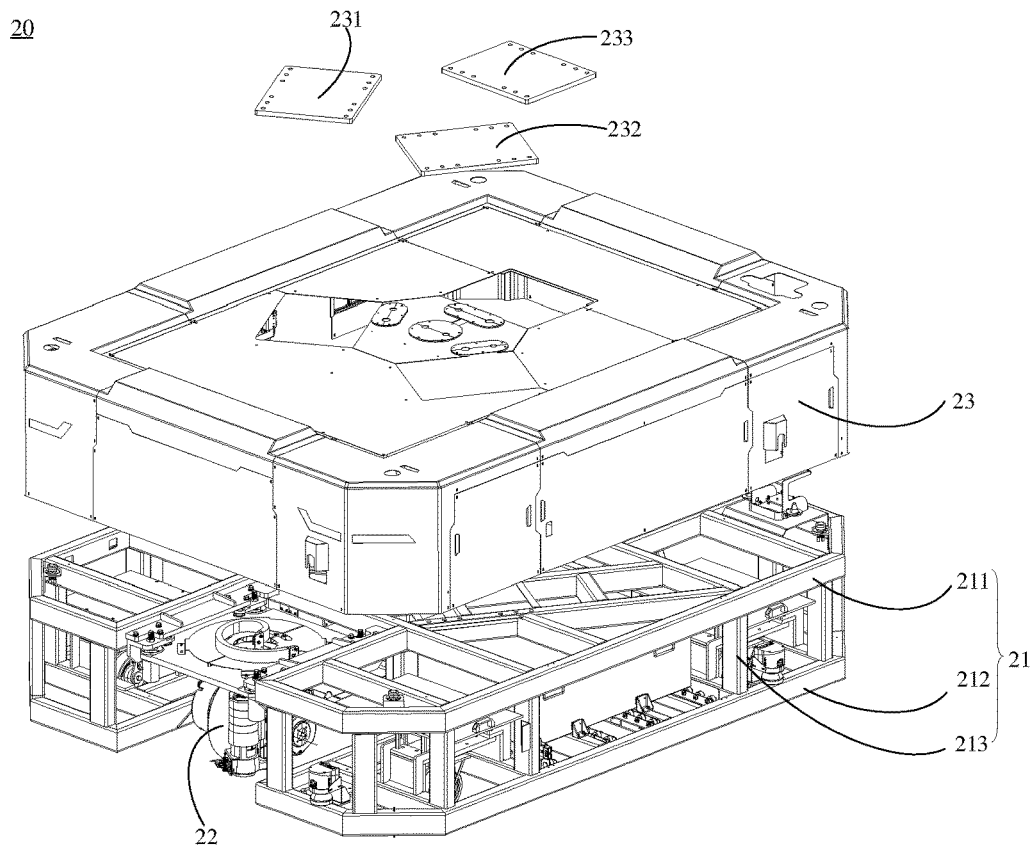
FIG. 4 illustrates an exploded view of an AGV base according to an embodiment in the present disclosure.

The AGV tool 100 is suitable for carrying passengers to play in a playground. Specifically, a placement area may be set at the parking lot of the playground for passengers' vehicles and the AGV tool 100. In an exemplary scene, a passenger needs to go to a playground and drives his/her car to arrive the parking lot of the playground where the placement area of the AGV tool 100 is arranged. After parking, the passenger may directly take the AGV tool at the placement area. The AGV tool 100 may be set in various kinds of parking lots, such as indoor parking lot, outdoor parking lot, stereo parking lot etc. Specifically, referring to FIGS. 3a and 3b, FIG. 3b illustrates a scene where the AGV tool is utilized in a placement area of a playground according to an embodiment in the present disclosure, and FIG. 4 is an exploded view of an AGV base according to an embodiment in the present disclosure. When a passenger parks a car in a stereo garage 200 illustrated in FIG. 3a, he/she can arrive the placement area of the AGV tool 100 illustrated in the right-bottom corner of FIG. 3a through a passageway D. After setting a route, the passenger may be carried by the AGV tool 100 to play in the playground illustrated in FIG. 3b, and visit multiple tourist spots. In FIG. 3b, four tourist spots are illustrated, including a first tourist spot M1, a second tourist spot M2, a third tourist spot M3 and a fourth tourist spot M4, where the path connecting each of the tourist spots is a tourist route. A dotted line in FIG. 3b illustrates an example of the tourist route. In this scene, a passenger may directly take the AGV tool 100 after getting off his/her car. Furthermore, he/she may take the AGV tool 100 all the time when he/she switches between different tourist spots of the playground instead of walking around and taking shuttle buses between the spots, which may greatly improve user experience.

Referring to FIGS. 1, 2 and 4, FIG. 4 is an exploded view of the AGV base according to an embodiment in the present disclosure. The AGV base 20 includes a central carriage component 21, a driving wheel component 22 and a case 23. The central carriage component 21 may include a top part 211 and a bottom part 212 that are spaced apart from and substantially parallel to each other. The top part 211 has a supporting surface. The top part 211 and the bottom part 212 may be connected by multiple brackets 213 and cooperatively define a receiving space. The driving wheel component 22 is arranged in the receiving space and configured to drive the AGV base 20 to move. The case 23 may cover the central carriage component 21. A first connection plate 231, a second connection plate 232 and a third connection plate 233 may be detachably connected to the case 23. The three connection plates may have a substantially triangular distribution on the surface of the case 23, and correspond to the top part 211 of the central carriage component 21, that is, a vertical projection of the three connection plates on the plane where the top part 211 is located may fall on the top part 211.

In one embodiment, the central carriage component 21 may be an independent component, which may be assembled with other components of the AGV base 20. Based on actual application scenarios, it can be replaced by other kinds of components, which may improve versatility and flexibility. Furthermore, the central carriage component 21 includes the top part 211 and the bottom part 212 spaced apart and parallel to each other, such that the top part 211 and the bottom part 212 may be designed with different configuration to improve the loading capacity of the top part 211 having the supporting surface, and thus the loading capacity of the AGV base 20 may be improved. Moreover, the driving wheel component 22 and other components of the AGV base 20 may all be arranged in the receiving space of the central carriage component 21, which may reduce space occupied by the AGV base 20 while increasing its loading capacity.

Figure 5:
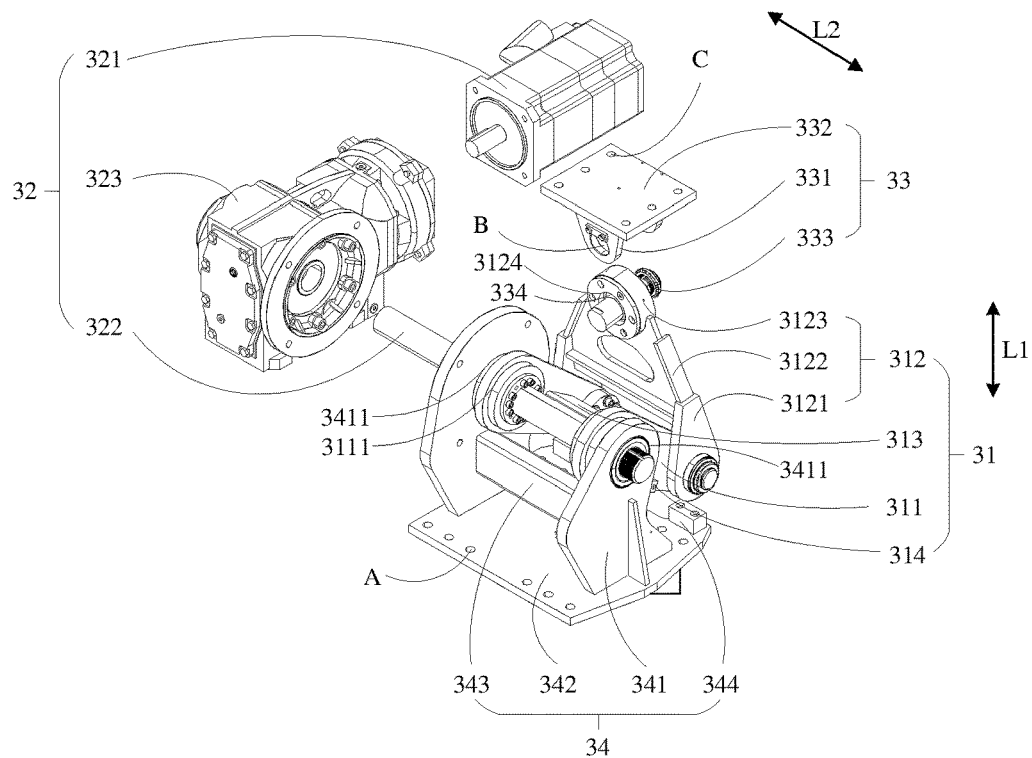
FIG. 5 illustrates an exploded view of a connection component according to an embodiment in the present disclosure.
Figure 6:
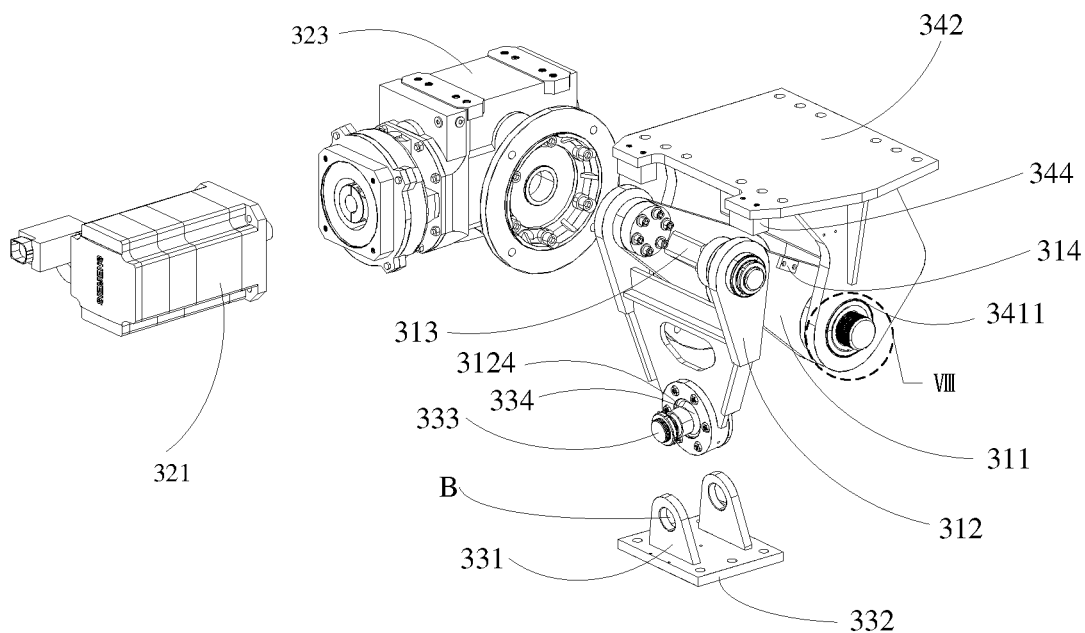
FIG. 6 illustrates an exploded view of the connection component illustrated in FIG. 5 taken in another direction.
Figure 7:
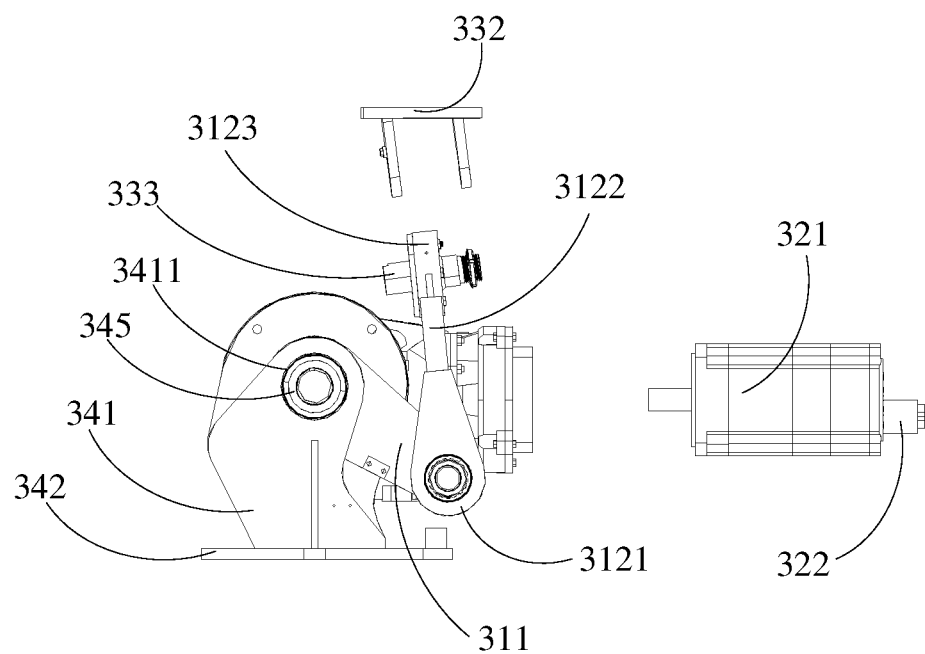
FIG. 7 illustrates an exploded view of the connection component illustrated in FIG. 5 taken in yet another direction.

Referring to FIGS. 5 to 7 together with FIGS. 1 to 4, FIG. 5 illustrates an exploded view of the connection component according to an embodiment in the present disclosure, FIG. 6 illustrates an exploded view of the connection component illustrated in FIG. 5 taken in another direction, and FIG. 7 illustrates an exploded view of the connection component illustrated in FIG. 5 taken in yet another direction. The connection component 30 may include a supporting plate 31, a driving component 32, an upper installation component 33 and a lower installation component 34. The driving component 32 may fixedly connect to the supporting component 31. The supporting component 31 may include two supporting arms 311 and a supporting plate 312. The two supporting arms 311 may be arranged at two sides of the supporting plate 312. One end of each supporting arm 311 is fixed to one end of the supporting plate 312 (the lower end of the supporting plate 312 as illustrated in FIG. 5, which may also be called as a first end) at a preset angle. The upper installation component 33 may be connected to another end of the supporting plate 312 (the upper end of the supporting plate 312 as illustrated in FIG. 5, which may also be called as a second end), and configured to fixedly connect to the cabin 10. The lower installation component 34 may be connected to the driving component 32 and configured to fixedly connect to the supporting surface of the AGV base 20.

The driving component 32 drives the supporting arms 311 to rotate, and accordingly drives the supporting plate 312 to move along a preset range in a first direction (see the double arrow L1 in FIG. 5). Thus, when the AGV tool 100 carries a passenger, a host computer may command the driving component 32 to drive the supporting plate 312 to slightly move in a safe range along the direction L1 such that the cabin 10 may deflect in a safe range, which may give more entertaining experience to the passenger taking the AGV tool 100. Moreover, when the cabin 10 carries a passenger, the center of gravity of the cabin 10 may change due to movement of the passenger. If shaking of the cabin 10 is severe, the AGV base 20 may deflect accordingly. According to the present disclosure, the host computer may acquire data on deflection of the AGV base 20 and accordingly command the driving component 32 to drive the supporting arms 311 to rotate a certain angle such that the supporting plate 312 is driven to move in the first preset range in the first direction, which may compensate shaking of the cabin 10 and help the AGV base 20 rebalance. In other words, the connection component 30 may drive the cabin 10 to swing in a safe range and meanwhile buffer relatively large shaking of the cabin 10. Thus, the implementation of the AGV tool 100 may be more entertaining and have better stability.

Referring to FIGS. 5 to 7, another end of each of the two supporting arms 311 (the end away from the supporting plate 312) is arranged with a first through hole 3111(as shown in FIG. 5). The driving component 32 includes a driving motor 321 and a transmission shaft 322 connected to each other. The transmission shaft 322 passes through the first through hole 3111 and is fixedly connected to the supporting arms 311 at the first through hole 3111. In this configuration, two ends of the supporting arm 311 are fixedly connected to the supporting plate 312 and the transmission shaft 322 respectively, that is, one of the two ends of the supporting arm 311 is connected to the supporting plate 312, and the other one of the two ends of the supporting arm 311 is connected to the transmission shaft 322, such that the driving component 32 may be fixed to the supporting component 31. When the driving motor 321 drives the transmission shaft 322 to rotate, it may also drive the supporting arms 311 to rotate and then drive the supporting plate 312 to move in the first preset range along the first direction. When the AGV base 20 is placed horizontally, the first direction is a vertical direction and the first supporting plate 312 also extends in the vertical direction. The supporting arms 311 extend at a preset angle to the vertical direction such that the supporting arms 311 may rotate only in a limited range (0 to 45°), which allows the supporting plate 312 may move in the first preset range in the vertical direction. Thus, shaking of the cabin 10 may be buffered, and the stability of the AGV tool 100 may be improved.

Referring to FIGS. 1 to 7, the lower installation component 34 includes two first socket plates 341 and a lower connection plate 342. The two first socket plates 341 are arranged at two sides of the supporting component 31 (specifically, two opposite sides of the two supporting arms 311), and parallel to the two supporting arms 311. Each first socket plate 341 is arranged with a second through hole 3411 (as shown in FIG. 5). The transmission shaft 322 passes through the second through hole 3411. That is, the transmission shaft 322 passes through, in sequence, the second through hole 3411 of the first socket plate 341 on the left, the first through hole 3111 of the supporting arm 311 on the left, the first through hole 3111 of the supporting arm 311 on the right, and the second through hole 3411 of the first socket plate 341 on the right, as illustrated in FIG. 5. The transmission shaft 322 may rotate in the second through hole 3411. The lower connection plate 342 may be connected and perpendicular to the first socket plates 341, and be parallel to the supporting surface of the AGV base 20. The lower connection plate 342 may be arranged with multiple first threaded holes A. The lower connection plate 342 and the supporting surface of the AGV base 20 may be fixedly connected through the first threaded holes A and bolts (not shown). Specifically, the lower connection plate 342 may be fixedly connected to one respective connection plate (the first connection plate 231, the second connection plate 232 or the third connection plate 233) on the case 23 of the AGV base 20. In one embodiment, the lower installation component 34 is configured not only to fixedly connect to the AGV base 20, but also for installation of the transmission shaft 322. Thus, when the driving component 32 drives the supporting arms 311 to rotate, the AGV tool 100 may be steadier.

Referring to FIGS. 5 to 7, the upper installation component 33 may include two second socket plates 331, an upper connection plate 332 and a connection shaft 333. The two second socket plates 331 may be set at two sides of the second end of the supporting plate 312 (the upper end of the supporting plate 312 as illustrated in FIG. 5, and the lower end of the supporting plate 312 as illustrated in FIG. 6), and be parallel to the supporting plate 312. Each second socket plate 331 may be arranged with a connection hole B. The second end of the supporting plate 312 is arranged with a third through hole 3124 (as shown in FIG. 5). The connection shaft 333 passes through both the connection holes B and the third through hole 3124, and fixedly connects to the two second socket plates 331 at the connection holes B. The connection shaft 333 may rotate in the third through hole 3124 of the second end of the supporting plate 312. The upper connection plate 332 may be perpendicular to the supporting plate 312, and parallel to the bottom surface of the cabin 10. The upper connection plate 332 may be arranged with multiple second threaded holes C. The upper connection plate 332 and the bottom surface of the cabin 10 may be fixedly connected through the second threaded holes C and bolts (not shown). Since the upper installation component 33 is fixedly connected to the cabin 10 through the upper connection plate 332 and the connection shaft 333 of the upper installation component 33 is capable of rotating in the third through hole 3124, the upper installation component 33 also moves in response to the shaking of the cabin 10 when the center of gravity of the cabin 10 changes and it shakes, which may buffer the shaking of the cabin 10.

Moreover, when the supporting plate 312 of one connection component 30 moves in the first preset range along the first direction (e.g., the supporting plate 312 moves a certain distance along the vertical direction), the cabin 10 accordingly incline somewhat. In this situation, the upper installation component 33 of the connection component 30 may also move in a certain range in response to the inclination of the cabin 10, in order to rebalance the cabin 10.

Referring to FIGS. 5 to 7, the present disclosure also provides a connection component 30 configured to connect the cabin 10 and the AGV base 20. The connection component 30 may include a supporting component 31, a driving component 32, an upper installation component 33 and a lower installation component 34.

The supporting component 31 may include two supporting arms 311 and a supporting plate 312. The two supporting arms 311 may be arranged at two sides of the supporting plate 312. One end of each supporting arm 311 is fixed to the first end of the supporting plate 312 (the lower end of the supporting plate 312 as illustrated in FIG. 5) at a preset angle. Another end of each supporting arm 311 (the end not connected to the supporting plate 312) may be arranged with a first through hole 3111 (as shown in FIG. 5).

The driving component 32 includes a driving motor 321 and a transmission shaft 322 connected to each other. The transmission shaft 322 passes through the first through hole 3111 of the supporting arms 311 and is fixedly connected to the supporting arms 311 at the first through hole 3111. The driving component 32 further includes a transmission device 323 connected to the driving motor 321 and the transmission shaft 322 and configured to increase or reduce output of the driving motor 321 so as to adjust motion of the supporting plate 312 in the first direction.

The upper installation component 33 may be connected to the second end of the supporting plate 312 (the upper end of the supporting plate 312 as illustrated in FIG. 5), and configured to fixedly connect to a first other component. The lower installation component 34 may be connected to the transmission shaft 322 of the driving component 32 and configured to fixedly connect to a second other component.

The driving component 32 drives the supporting arms 311 to rotate, and accordingly drive the supporting plate 312 to move in a preset range in a first direction (see the double arrow L1 in FIG. 5). When the first other component shakes due to the change of its center of gravity, the driving component 32 of the connection component 30 may drive the supporting arms 311 to rotate a certain angle, and accordingly drive the supporting plate 312 to move in the first preset range along the first direction such that shaking of the first other component may be reduced and the first other component may be rebalanced. In other words, the connection component 30 may buffer shaking of the first other component such that the stability of the assembly of the first other component and the connection component 30 may be improved. In another scenario, when the first other component and the second other component are both in a steady state, the driving component 32 may be utilized to drive the supporting plate 312 to move slightly in the first direction such that the assembly of the connection component 30 and the other component(s) may acquire safe shaking state.

Referring to FIGS. 5 to 7, the supporting plate 312 may include a first supporting part 3121, a second supporting part 3122 and a third supporting part 3123 connected to each other. The number of the first supporting part 3121 may be two, i.e., there may be two first supporting parts 3121. The two first supporting parts 3121 may be located at two opposite sides of the two supporting arms 311 and parallel to the supporting arms 311. One end of the first supporting part 3121 (the lower end of the first supporting part 3121 as shown in FIG. 5) may be fixedly connected to one end of the supporting arm 311 at a preset angle. Two ends of the second supporting part 3122 may be fixedly connected to another end of the first supporting part 3121 (the upper end of the first supporting part 3121 as illustrated in FIG. 5) and one end of the third supporting part 3123. In some embodiments, the end of the second supporting part 3122 away from the first supporting part 3121 may have an arc-shaped configuration, and the third supporting part 3121 may have a cylindrical configuration which partially engages with the arc-shaped configuration of the second supporting part 3122. Another end of the third supporting part 3123 may be connected to the upper installation component 33. In some embodiments, the second supporting part 3122 and the third supporting part 3123 may be located in a same plane which is perpendicular to the plane where the first supporting part 3121 is located, and which is perpendicular to the plane where the supporting arms 311 are located. The supporting plate 312 with such configuration may improve the overall structure stability.

The supporting component 31 may further includes a first beam 313 arranged between the two supporting arms 311. Two ends of the first beam 313 may be fixedly connected to two opposite sides of the two supporting arms 311, which may improve the stability of the supporting component 31 and make connection between the supporting arms 311 and the supporting plate 312 more robust.

Referring to FGIS. 5 to 8, the lower installation component 34 includes two first socket plate 341 and a lower connection plate 342. The two first socket plates 341 are arranged at two sides of the supporting component 31 (specifically, two opposite sides of the two supporting arms 311), and parallel to the two supporting arms 311. Each first socket plate 341 is arranged with a second through hole 3411 (as shown in FIG. 5). The transmission shaft 322 passes through the second through hole 3411 such that the lower installation component 34 and the driving component 32 may be connected. That is, the transmission shaft 322 passes through, in sequence, the second through hole 3411 of the first socket plate 341 on the left, the first through hole 3111 of the supporting arm 311 on the left, the first through hole 3111 of the supporting arm 311 on the right, and the second through hole 3411 of the first socket plate 341 on the right, as illustrated in FIG. 5. The transmission shaft 322 may rotate in the second through hole 3411. The lower connection plate 342 may be connected and perpendicular to the first socket plates 341. The lower connection plate 342 may be arranged with multiple first threaded holes A. The lower connection plate 342 and the second other component may be connected through the first threaded holes A.

Figure 8:
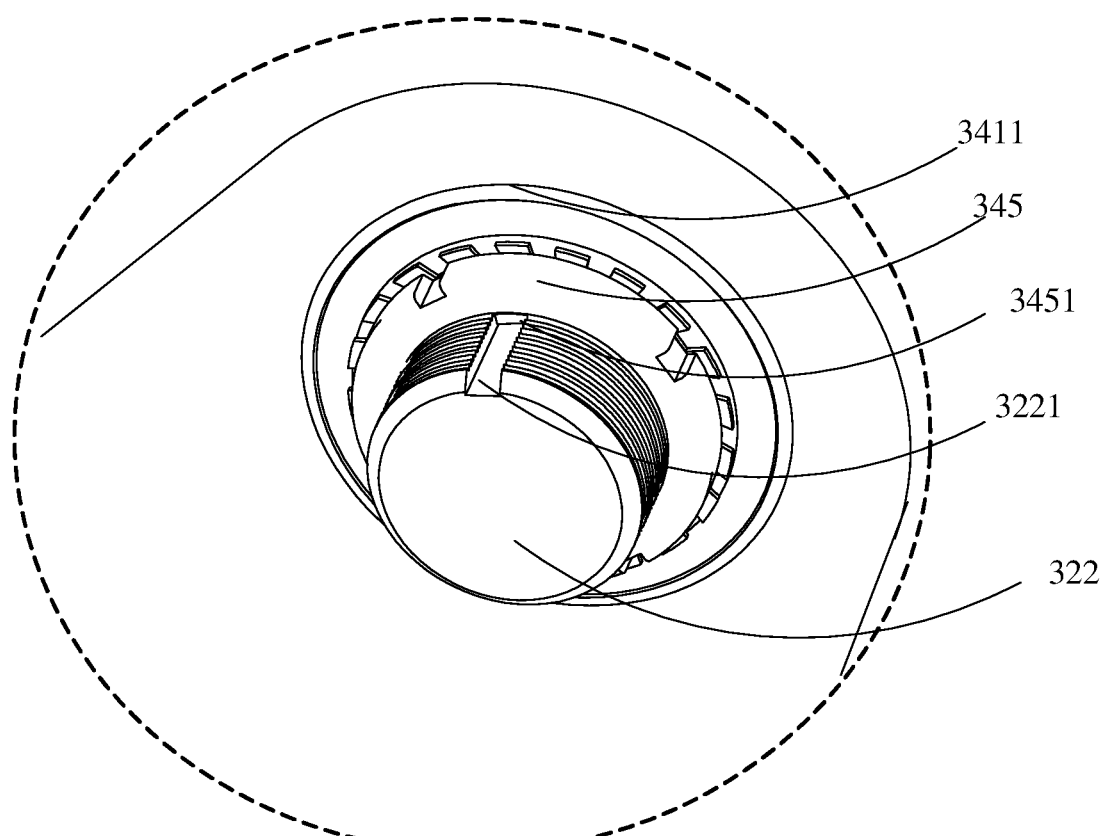
FIG. 8 illustrates an enlarged view of a first bearing and a transmission shaft according to an embodiment in the present disclosure.

In some embodiments, the lower installation component 34 may further include a first bearing 345 (as shown in FIG. 7). An inner wall of the first bearing 345 is arranged with at least one protrusion 3451 (as shown in FIG. 8). The first bearing 345 may be set in the second through hole 3411 of the first socket plate 341. The transmission shaft 322 passes through the first bearing 345 such that the transmission shaft 322 may rotate in the second through hole 3411. A region of the transmission shaft 322 contacting the first bearing 345 is arranged with at least one slot 3221. Shapes of the protrusion 3451 and the slot 3221 matches with each other, and a width of the slot 3221 is slightly larger than the diameter of the protrusion 3451. Thus, the first bearing 345 may be engaged with the transmission shaft 322 such that the driving motor 321 may drive the transmission shaft 322 to rotate in a clockwise or anti-clockwise direction. Thus, the supporting arms 311 may be driven to rotate in a clockwise or anti-clockwise direction, and the supporting plate 312 may move in the first preset range along the first direction. In some embodiments, the rotation range of the supporting arms 311 is set as 45°, that is, when the vertical direction of the supporting plate 312 is taken as 0°, the supporting arms 311 may rotate in the range of −22.5° to 22.5°.

The lower installation component 34 further includes a second beam 343 arranged between the two first socket plates 341. Two ends of the second beam 343 may be fixedly connected to two opposite sides of the two first socket plates 341. This configuration may improve the stability of the lower installation component 34, and improve the stability of the assembly of the connection component 30 and other components.

In one embodiment, the lower installation component 34 is configured not only to fixedly connect to the second other component, but also for installation of the transmission shaft 322. Thus, when the driving component 32 drives the supporting arms 311 to rotate and then drives the supporting plate 312 to move along the first direction, the assembly of the connection component 30 and other components may be steadier.

Referring to FIGS. 5 to 7, the upper installation component 33 may include two second socket plates 331, an upper connection plate 332 and a connection shaft 333. The two second socket plates 331 may be set at two sides of the second end of the supporting plate 312 (the upper end of the supporting plate 312 as illustrated in FIG. 5), and be parallel to the supporting plate 312. Each second socket plate 331 may be arranged with a connection hole B. The second end of the supporting plate 312 (i.e., the third supporting part 3123) is arranged with a third through hole 3124 (as shown in FIG. 5). The connection shaft 333 passes through both the connection holes B and the third through hole 3124, and fixedly connects to the two second socket plates 331 at the connection holes B. The connection shaft 333 may rotate in the third through hole 3124 of the third supporting part 3123. The upper connection plate 332 may be perpendicular to the supporting plate 312. The upper connection plate 332 may be arranged with multiple second threaded holes C. The upper connection plate 332 and the first other component may be fixedly connected through the second threaded holes C.

In some embodiments, the upper installation component 33 may further include a second bearing 334 (as shown in FIG. 5). The second bearing 334 is arranged in the third through hole 3124 of the third supporting part 3123. The connection shaft 333 passes through the second bearing 334 such that the connection shaft 333 may rotate in the third through hole 3124. Thus, when the first other component connecting to the upper connection plate 332 shakes, the upper installation component 33 may move in a second preset range along a second direction in response to shaking of the first other component. The double arrow L2 of FIG. 5 illustrates an example of the second direction. The second direction is perpendicular to the first direction.

In one embodiment, the upper installation component 33 is fixedly connected to the first other component through the upper connection plate 332, and the connection shaft 333 of the upper installation component 33 may rotate in the third through hole 3124. Thus, when the first other component shakes (e.g., the cabin 10 shakes due to change of its center of gravity), the upper installation component 33 may move in response to shaking of the first other component such that shaking of the first other component may be buffered.

Referring to FIGS. 5 to 7, the lower installation component 34 may further include two first stop blocks 344. The first stop block 344 corresponds to the supporting plate 312, fixedly connects to the lower connection plate 342, and is configured to limit a motion range of the supporting plate 312 in the first direction. Specifically, one first stop block 344 corresponds to one first supporting part 3121 and is located at a corresponding position of the lower connection plate 342. When the supporting plate 312 moves towards the lower connection plate 342, the first stop block 344 may limit the motion range of the supporting plate 312. The implementation of the first stop blocks 344 may prevent the supporting plate 312 from being too close to the lower connection plate 342, which may improve the stability of the assembly of the connection component 30 and other components.

In some embodiments, the supporting component 31 may further include two second stop blocks 314 located at two opposite sides of the two supporting arms 311 respectively, that is, one of two second stop blocks 314 is located at one of the two opposite sides of the two supporting arms 311, and another of two second stop blocks 314 is located at another of the two opposite sides of the two supporting arms 311. The second stop blocks 314 are configured to limit a motion range of the supporting plate 312 in the first direction. Specifically, when the supporting plate 312 moves towards the lower connection plate 342, the second stop block 314 may limit the motion range of the supporting plate 312. The implementation of the second stop blocks 314 may prevent the supporting plate 312 from being too close to the first socket plates 341, which may improve the stability of the assembly of the connection component 30 and other components.

The foregoing is merely embodiments of the present disclosure, and is not intended to limit the scope of the disclosure. Any transformation of equivalent structure or equivalent process which uses the specification and the accompanying drawings of the present disclosure, or directly or indirectly application in other related technical fields, are likewise included within the scope of the protection of the present disclosure.

What is claimed is:

1. An automated guided vehicle (AGV) tool for entertainment and transportation, comprising a cabin, an AGV base, and a connection component connecting the cabin and the AGV base;

wherein the AGV base comprises a central carriage component and a driving wheel component connected to the central carriage component, the central carriage component comprises a top part and a bottom part spaced apart from and parallel to each other, the top part has a supporting surface; the driving wheel component is configured to drive the AGV base to move;

wherein the connection component comprises a supporting component, a driving component, an upper installation component and a lower installation component, the driving component is fixed to the supporting component, the supporting component comprises two supporting arms and a supporting plate, the two supporting arms are arranged at two sides of the supporting plate, one end of each of the two supporting arms is fixed to a first end of the supporting plate at a preset angle, the upper installation component is connected to a second end of the supporting plate and configured to fixedly connect to the cabin, the lower installation component is connected to the driving component and configured to fixedly connect to the supporting surface of the AGV base;

wherein the driving component is configured to drive the two supporting arms to rotate to drive the supporting plate to move in a first preset range along a first direction so as to buffer shaking of the cabin;

another end of each of the two supporting arms is arranged with a first through hole, the driving component comprises a driving motor and a transmission shaft connected to each other, the transmission shaft passes through the first through hole of each of the two supporting arms and is fixedly connected to the two supporting arms at the first through hole;

when the driving motor drives the transmission shaft to rotate, the two supporting arms are driven to rotate and accordingly drive the supporting plate to move in the first preset range along the first direction;

the upper installation component comprises two second socket plates, an upper connection plate and a connection shaft;

the two second socket plates are arranged at two sides of the second end of the supporting plate and parallel to the supporting plate, the two second socket plates are each arranged with a connection hole;

the second end of the supporting plate is arranged with a third through hole, the connection shaft passes through the connection hole and the third through hole, and is fixedly connected to the two second socket plates at the connection hole; and the upper connection plate is perpendicular to the supporting plate, and parallel to a bottom surface of the cabin, the upper connection plate is fixedly connected to the bottom surface of the cabin.

2. The AGV tool for entertainment and transportation of claim 1, wherein the lower installation component comprises two first socket plates and a lower connection plate;

the two first socket plates are arranged at two sides of the supporting component and parallel to the two supporting arms, the two first socket plates each have a second through hole and the transmission shaft passes through the second through hole;

the lower connection plate is perpendicular and fixedly connected to the two first socket plates, and parallel to the supporting surface of the AGV base, the lower connection plate is fixedly connected to the supporting surface of the AGV base.

3. The AGV tool for entertainment and transportation of claim 1, wherein a number of the connection component is at least three.

4. The AGV tool for entertainment and transportation of claim 3, wherein the number of the connection component is three;

the AGV base further comprises a case covering the central carriage component;

three connection components are connected to the AGV base at three connection points which locate on a surface of the case, and the three connection components have triangular distribution.

5. A connection component comprising:

a supporting component comprising two supporting arms and a supporting plate; wherein, the two supporting arms are arranged at two sides of the supporting plate, one end of each of the two supporting arms is fixed to a first end of the supporting plate at a preset angle, another end of each of the two supporting arms is arranged with a first through hole;

a driving component comprising a driving motor and a transmission shaft connected to each other; wherein the transmission shaft passes through the first through hole of each of the two supporting arms and is fixedly connected to the two supporting arms at the first through hole;

an upper installation component connected to a second end of the supporting plate, and configured to fixedly connect to a first other component; and a lower installation component connected to the driving component, and configured to fixedly connect to a second other component;

wherein, when the driving motor drives the transmission shaft to rotate, the two supporting arms are driven to rotate and accordingly drive the supporting plate to move in a first preset range along a first direction;

the lower installation component comprises two first socket plates;

the two first socket plates are arranged at two sides of the supporting component and parallel to the two supporting arms, the two first socket plates each have a second through hole and the transmission shaft passes through the second through hole to connect the lower installation component and the driving component.

6. The connection component of claim 5, wherein the lower installation component further comprises a first bearing of which an inner wall is arranged with at least one protrusion, the first bearing is set in the second through hole;

the transmission shaft passes through the first bearing, a region of the transmission shaft contacting the first bearing is arranged with at least one slot which matches the at least one protrusion, a width of the at least one slot is slightly larger than a diameter of the at least one protrusion of the first bearing such that the first bearing engages with the transmission shaft and the driving motor is capable of driving the transmission shaft rotate in a clockwise or anti-clockwise direction.

7. The connection component of claim 5, wherein the lower installation component further comprises a lower connection plate;

the lower connection plate is perpendicular and fixedly connected to the two first socket plates, the lower connection plate is arranged with a plurality of first threaded holes, the lower connection plate and the second other component are fixedly connected through the plurality of first threaded holes.

8. The connection component of claim 7, wherein the lower installation component further comprises two first stop blocks, the two first stop blocks are arranged on the lower connection plate and correspond to the supporting plate, the two first stop blocks are configured to limit a motion range of the supporting plate in the first direction.

9. The connection component of claim 5, wherein the second end of the supporting plate is arranged with a third through hole;

the upper installation component comprises a second bearing and a connection shaft, the second bearing is set in the third through hole, the connection shaft passes through the second bearing such that the upper installation component and the second end of the supporting plate are connected and the upper installation component is capable of moving in a second preset range in a second direction in response to shaking of the first other component; wherein the second direction is perpendicular to the first direction.

10. The connection component of claim 9, wherein the upper installation component further comprises an upper connection plate and two second socket plates connected to the upper connection plate;

the two second socket plates are arranged at two sides of the second end of the supporting plate and parallel to the supporting plate, the two second socket plates are each arranged with a connection hole;

the connection shaft comprises two ends, one end passes through and is fixed to the connection hole of one of the two second socket plates; the other end passes through and is fixed to the connection hole of the other one of the two second socket plates; the upper connection plate is perpendicular to the supporting plate and arranged with a plurality of second threaded holes, the upper connection plate is fixedly connected to the first other component through the plurality of second threaded hole.

11. The connection component of claim 5, wherein the supporting plate comprises a first supporting part, a second supporting part and a third supporting part connected to each other;

an end of the first supporting part is fixedly connected to the one end of each of the two supporting arms at a preset angle, two ends of the second supporting part are fixedly connected to the another end of each of the two supporting arms and one end of the third supporting part, another end of the third supporting part is connected to the upper installation component;

the second supporting part is located in a same plane as the third supporting part, which is perpendicular to a plane where the first supporting part is located.

12. The connection component of claim 11, wherein the first supporting part comprises two sub-components located at two opposite sides of the two supporting arms and parallel to the two supporting arms;

one end of one of the two sub-components is fixedly connected to the one end of one of the two supporting arms at a preset angle.

13. The connection component of claim 5, wherein the driving component further comprises a transmission device fixedly connected to the driving motor and the transmission shaft, the transmission device is configured to increase or reduce output of the driving motor to adjust motion of the supporting plate in the first direction.

14. The connection component of claim 5, wherein the supporting component further comprises two second stop blocks located at two opposite sides of the two supporting arms, and configured to limit a motion range of the supporting plate in the first direction.

15. An automated guided vehicle (AGV) tool for entertainment and transportation, comprising a cabin, an AGV base, and a connection component connecting the cabin and the AGV base;

the connection component comprises:

a supporting component, comprising a supporting plate and two supporting arms connected to the supporting plate;

a driving component, fixed to the supporting component;

an upper installation component, fixedly connected to the cabin, and rotatablely connected to the supporting component; and a lower installation component, fixedly connected to the AGV base, and rotatablely connected to the supporting component;

wherein the driving component is configured to drive the supporting component to move in a first preset range along a first direction so as to buffer shaking of the cabin;

the supporting plate comprises a first supporting part, a second supporting part and a third supporting part connected to each other;

an end of the first supporting part is fixedly connected to the one end of each of the two supporting arms at a preset angle, two ends of the second supporting part are fixedly connected to the another end of each of the two supporting arms and one end of the third supporting part, another end of the third supporting part is connected to the upper installation component;

the second supporting part is located in a same plane as the third supporting part, which is perpendicular to a plane where the first supporting part is located.

16. The AGV tool according to claim 15, wherein one end of each of the two supporting arms is fixed to one end of the supporting plate at a preset angle, another end of each of the two supporting arms is fixedly connected to the driving component.

17. The AGV tool according to claim 16, wherein the driving component comprising a driving motor and a transmission shaft connected to each other;

wherein the another end of each of the two supporting arms is arranged with a first through hole, and the transmission shaft passes through the first through hole and is fixedly connected to the two supporting arms at the first through hole; when the driving motor drives the transmission shaft to rotate, the two supporting arms are driven to rotate and accordingly drive the supporting plate to move in a first preset range along a first direction.

18. The AGV tool according to claim 17, wherein the lower installation component comprises two first socket plates;

the two first socket plates are arranged at two sides of the supporting component and parallel to the two supporting arms, the two first socket plates each have a second through hole and the transmission shaft passes through the second through hole to connect the lower installation component and the driving component.

19. The AGV tool of claim 18, wherein the lower installation component further comprises a first bearing of which an inner wall is arranged with at least one protrusion, the first bearing is set in the second through hole;

the transmission shaft passes through the first bearing, a region of the transmission shaft contacting the first bearing is arranged with at least one slot which matches the at least one protrusion, a width of the at least one slot is slightly larger than a diameter of the at least one protrusion of the first bearing such that the first bearing engages with the transmission shaft and the driving motor is capable of driving the transmission shaft rotate in a clockwise or anti-clockwise direction.

20. The AGV tool of claim 18, wherein the lower installation component further comprises a lower connection plate;

the lower connection plate is perpendicular and fixedly connected to the two first socket plates, the lower connection plate is arranged with a plurality of first threaded holes, the lower connection plate and a second other component are fixedly connected through the plurality of first threaded holes.

* * * * *